Nov. 14, 1972  P. R. HUEBOTTER  3,702,803
FUEL ASSEMBLY FOR A FAST REACTOR
Filed Feb. 12, 1971  2 Sheets-Sheet 1
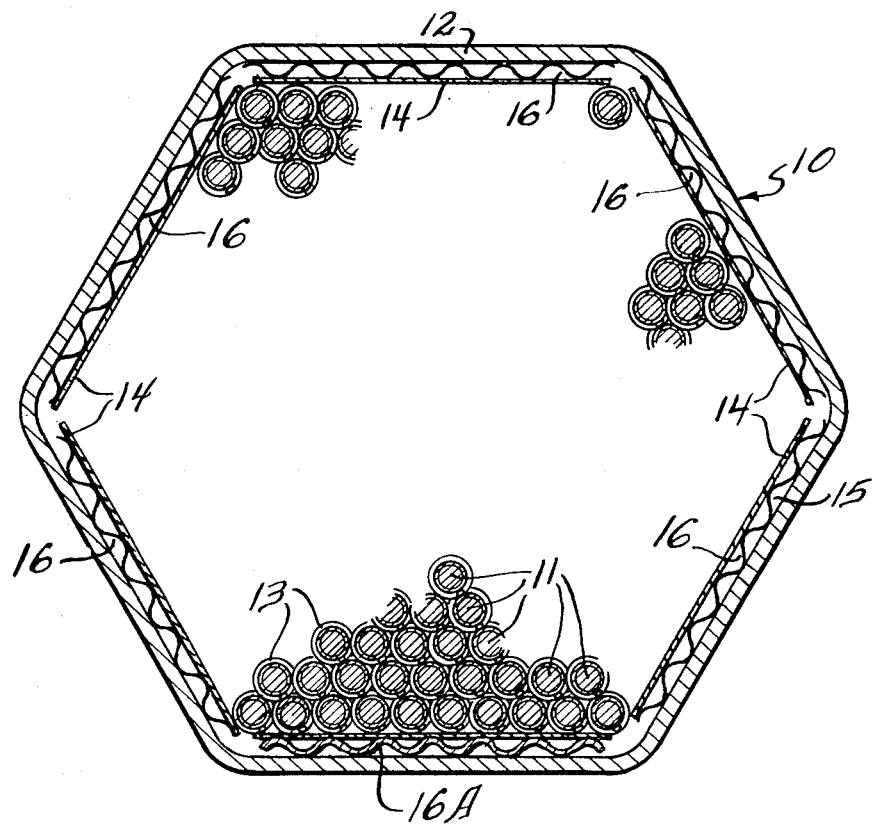

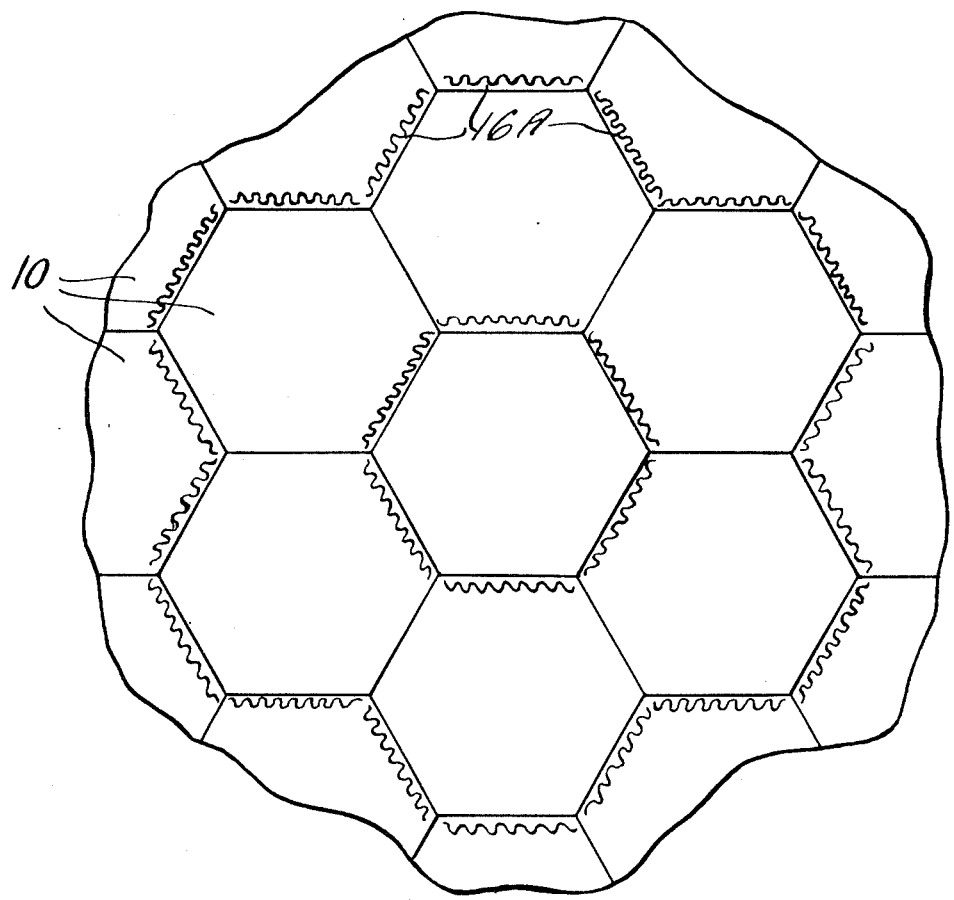

United States Patent Office 3,702,803
Patented Nov. 14, 1972

3,702,803
FUEL ASSEMBLY FOR A FAST REACTOR
Paul R. Huebotter, Downers Grove, Ill., assignor to the United States of America as represented by the United States Atomic Energy Commission
Filed Feb. 12, 1971, Ser. No. 114,768
Int. Cl. G21c 3/34
U.S. Cl. 176—40
4 Claims

ABSTRACT OF THE DISCLOSURE

A fuel assembly for a fast reactor consisting of a bundle of spaced, elongated, stainless-steel-clad fuel pins disposed within a coolant duct contains means for cooling the coolant duct to a lower temperature than that of the bundle of fuel pins and a crushable spacer material disposed in an annulus between the bundle of fuel pins and the coolant duct so that the coolant duct does not swell even though the fuel pins do swell. The crushable spacer material may be extra strength on the side of the fuel assembly closest to the centerline of the reactor core.

CONTRACTURAL ORGIN OF THE INVENTION

The invention described herein was made in the course of, or under, a contract with the United States Atomic Energy Commission.

BACKGROUND OF THE INVENTION

This invention relates to the control of fast-neutron-induced swelling of structural materials used in a fast reactor.

In more detail, the invention relates to the prevention of swelling of the collant ducts of a fast reactor.

The invention also relates to fuel assemblies for a fast breeder reactor in which swelling of the fuel pins in the fuel assembly will not cause swelling of the coolant duct surrounding the fuel assemblies.

The invention further relates to a fast breeder reactor core in which swelling of fuel pins will not cause the coolant ducts surrounding the fuel pins to swell.

Fast breeder reactors now being designed typically include a plurality of fuel assemblies each consisting of a bundle of spaced, parallel, slender, elongated fuel pins containing a nuclear fuel material enclosed within a coolant duct through which liquid sodium flows. The fuel material in the fuel pins is protected from the sodium by cladding which must provide adequate containment for fuel and fission products while having a reasonably low cross section for neutrons. The austenitic stainless steels—such as type 316 stainless steel—are now favored for use as cladding material and as the material of construction of the coolant ducts.

A serious problem arising from the use of stainless steel for this purpose is the swelling which occurs in stainless steel when it has been irradiated with fast neutrons for a substantial length of time. Not only will this cause dilation of individual fuel pins which will result in dilation and bowing of the entire fuel bundle and thereby of the coolant duct surrounding the fuel bundle, but it will also cause swelling of the coolant duct directly. If the coolant ducts are expected to swell, large gaps must be left between assemblies when the assemblies are installed into the reactor. Thus the core cannot be made tight near the core midplane as is conventionally done with the bearing pads affixed to the ducts. Also elongation and bowing of fuel assemblies produces uncertainty and variance in the axial and radial location of their handling heads when the core is unclamped for fuel handling. Such uncertainties are troublesome in a blind fuel handling operation which is usually carried out in a sodium-cooled reactor.

SUMMARY OF THE INVENTION

According to the present invention the individual fuel pins are permitted to swell but the construction of the fuel assembly is such that the collant duct will not swell or bow. This is accomplished by separately cooling the coolant duct to a temperature substantially below that of the fuel bundle and by providing a crushable spacer around the fuel bundle within the coolant duct. Bowing of the fuel bundle inwardly toward the core center according to one detailed embodiment of the invention is prevented by providing a stronger crushable spacer material on the side of the fuel assembly oriented generally toward the core center.

BRIEF DESCRIPTION OF THE DRAWINGS

The invention will next be described in connection with the accompanying drawings wherein FIG. 1 is a schematic cross section of a fuel assembly for a fast reactor for incorporating the present invention and FIG. 2 is a sketch illustrating how a plurality of such fuel assemblies may be combined in a reactor core.

DESCRIPTION OF A SPECIFIC EMBODIMENT OF THE INVENTION

As shown in the drawing, a hexagonal bundle 10 of spaced, parallel, slender, elongated, stainless-steel-clad fuel pins 11 is enclosed within a hexagonal coolant duct on shroud 12. Fuel pins 11 are spaced one from the other by helical wire wraps 13 as is conventional in the art. Immediately surrounding bundle 10 of fuel pins 11 are a plurality of flow dividers 14 which are spaced from coolant duct 12 to form an annulus 15. In a typical fuel assembly which is 5 inches across flats the annulus should be about 0.2 inch in width. Flow dividers 14 are constructed of a stanless-steel-backed insulating sandwich which insulates annulus 15 from the main flow of coolant through the fuel bundle to a considerable extent. Reactor inlet coolant flowing upwardly through annulus 14 is not heated directly by the fuel bundle 10 and accordingly maintains the temperature of coolant duct 12 at 650° F. or less, whereas the maximum surface temperature of the fuel pins 11 is approximately 1200° F. Due to the temperature dependence of fast-neutron-induced stainless-steel swelling, little if any swelling of duct 12 will occur. Disposed in annulus 15 are a plurality of crushable spacers 16 each consisting of a corrugated stainless-steel plate which accommodate any swelling of the individual fuel pins and the fuel bundle so that fast-neutron-induced swelling of the stanless-steel cladding can occur without affecting the external dimensions of the coolant duct. One or two crushable spacers 16 surrounding each bundle 10 may be of greater strength than the remaining spacers and these spacers 16A will be oriented in the general direction of the center of the reactor core, as is shown in FIG. 2, when the fuel assembly is in position in a reactor. Bowing of the fuel bundle toward the center of the reactor has been found to be a problem in fast reactors operated in the past and provision of extra strength crushable spacers on the side(s) of the duct oriented toward the center of the reactor core will help in alleviating this problem.

While corrugated plates have been specified as the crushable spacer material in the specific embodiment of the invention described above, it will be appreciated that other spacer materials that will accomplish the same function may also be used. For example, springs of various types and orientations relative to the direction of flow of the coolant may also be used.

In its broadest aspect this invention does not require that some of the crushable spacers be stronger than others. The following advantages arise from provision of means for separately cooling the coolant duct and of crushable spacers between the fuel bundle and the coolant duct to prevent the coolant duct from swelling. The further advantage attained by the use of extra strength crushable spacers in certain locations has been noted above.

(1) Proven core clamping methods can be retained. That is, bearing pads can be affixed to ducts near the core midplane and the radial location of assembly centerlines assured at the plane of tightness.

(2) The uncertainty in axial and radial location of handling heads, due to elongation and bowing of core assemblies, is essentially eliminated.

(3) The concept requires little development. All departures from current design practice are within the fuel assembly, and necessary testing can be done in existing facilities.

(4) The concept is compatible with the "helical-wire-wrap" method for fuel element support and spacing, the method regarded as the most economical and requiring the least development.

(5) Maximum flexibility is retained for capitalizing on advances in materials' technology during the life of the plant (typically 30 years). That is, with all the relevant features contained within the duct, the design can be reoptimized every core lifetime (typically 2 years).

(6) Ducts operating at low temperature can be expected to accept higher fracture strain from impulses loading and therefore absorb more blast energy in a major core accident than ducts operating at high temperautre.

(7) The hazard of assembly-to-assembly damage propagation is reduced by the additional barriers between fuel bundles and the crushable energy absorbing material within the duct.

The most obvious disadvantage of this concept is degradation of mixed-outlet coolant temperature. This must be assessed by thermal-hydraulic analyses of the design and a trade-off study between degree of duct heating vs. degree of degradation. Degradation can be reduced by allowing some internal mixing between fuel bundle coolant and bypass coolant above the plane of the bearing pads. The benefits from this must be assessed quantitatively.

It will be understood that the invention is not to be limited to the details given herein but that it may be modified within the scope of the appended claims.

The embodiments of the invention in which an exclusive property or privilege is claimed are defined as follows:

1. A fuel assembly for a fast breeder nuclear reactor comprising a bundle of spaced, parallel, elongated, stainless-steel-clad fuel pins enclosed within a stainless steel coolant shroud, said fuel assembly being adapted to be employed as part of a reactor core in which coolant flows upwardly through the fuel assemblies, flow dividers surrounding the bundle of fuel pins and spaced from said coolant shroud to define an annulus between the bundle of fuel pins and the coolant duct whereby unheated coolant flows through the annulus to maintain the stainless steel coolant shroud at a temperature below that at which fast-neutron-induced stainless-steel swelling occurs, and crushable spacers disposed within said annulus to prevent fast-neutron-induced swelling of the stainless-steel cladding of the fuel pins from causing swelling of the coolant shroud, wherein at least one crushable spacer within the fuel assembly has greater resistance to crushing than have the others in the fuel assembly for orientation on a side of the fuel assembly where higher resistance to movement of the bundle of fuel pins is expected to be necessary.

2. A fuel assembly according to claim 1 wherein the coolant shroud and fuel bundle are hexagonal in cross section and the crushable spacers constitute six corrugated stainless-steel plates disposed one to a side of the hexagon.

3. A fast breeder nuclear reactor core consisting of a plurality of fuel assemblies constructed as described in claim 1 wherein the crushable spacers having greater resistance to crushing are oriented generally toward the center of the reactor core.

4. A fast breeder nuclear reactor core consisting of a plurality of fuel assemblies constructed as described in claim 2 wherein the crushable, corrugated, stainless-steel plates having greater resistance to crushing are oriented generally toward a central fuel assembly in which all crushable, corrugated, stainless-steel plates have equal resistance to crushing.

References Cited
UNITED STATES PATENTS

| | | | |
|---|---|---|---|
| 3,317,399 | 5/1967 | Winders | 176—78 |
| 3,104,218 | 9/1963 | Speidel et al. | 176—78 |
| 3,607,642 | 9/1971 | Murdock | 176—78 |
| 3,280,003 | 10/1966 | Alfille et al. | 176—78 X |
| 3,240,680 | 3/1966 | Laithwaite et al. | 176—78 X |

CARL D. QUARFORTH, Primary Examiner

G. G. SOLYST, Assistant Examiner

U.S. Cl. X.R.

176—78